(12) United States Patent
Li et al.

(10) Patent No.: US 12,468,034 B2
(45) Date of Patent: Nov. 11, 2025

(54) PHASE DIFFERENCE DETECTION SYSTEM AND A METHOD FOR DETECTING A PHASE DIFFERENCE

(71) Applicants: Imec vzw, Leuven (BE); Universiteit Gent, Ghent (BE)

(72) Inventors: YanLu Li, Kessel-Lo (BE); Roeland Baets, Deinze (BE)

(73) Assignees: Imec vzw, Leuven (BE); Universiteit Gent, Ghent (BE)

( * ) Notice: Subject to any disclaimer, the term of this patent is extended or adjusted under 35 U.S.C. 154(b) by 1038 days.

(21) Appl. No.: 17/604,950

(22) PCT Filed: May 4, 2020

(86) PCT No.: PCT/EP2020/062265
§ 371 (c)(1),
(2) Date: Oct. 19, 2021

(87) PCT Pub. No.: WO2020/225187
PCT Pub. Date: Nov. 12, 2020

(65) Prior Publication Data
US 2022/0214456 A1 Jul. 7, 2022

(30) Foreign Application Priority Data
May 9, 2019 (EP) .................................. 19173535

(51) Int. Cl.
*G01S 17/58* (2006.01)
*G01B 5/02* (2006.01)
(Continued)

(52) U.S. Cl.
CPC ............ *G01S 17/58* (2013.01); *G01S 7/4812* (2013.01); *G01S 7/4818* (2013.01); *G01S 7/4915* (2013.01); *G01B 5/02* (2013.01)

(58) Field of Classification Search
None
See application file for complete search history.

(56) References Cited

U.S. PATENT DOCUMENTS

| 2018/0024246 A1* | 1/2018 | Jeong | ..................... G01S 17/58 |
| | | | 359/204.1 |
| 2022/0196804 A1* | 6/2022 | Li | ......................... G01S 17/58 |

FOREIGN PATENT DOCUMENTS

| CN | 207460192 U | 6/2018 |
| EP | 0625690 A1 | 11/1994 |

(Continued)

OTHER PUBLICATIONS

PCT International Search Report and Written Opinion, Application No. PCT/EP2020/062265, mailed Aug. 18, 2020, 10 pages.
(Continued)

*Primary Examiner* — Eric L Bolda
(74) *Attorney, Agent, or Firm* — McDonnell Boehnen Hulbert & Berghoff LLP

(57) ABSTRACT

Example embodiments relate to phase difference detection systems and method for detecting phase difference. One embodiment includes a phase difference detection system for a single target location. The system includes a laser source to generate a laser beam. The system also includes a phase difference detector coupled to the laser source and having a multi-layer structure. The phase difference detector includes a planar waveguide for guiding the laser beam. The phase difference detector also includes a grating coupler to split the laser beam into a reference beam and a measurement beam. Additionally, the phase detector includes a planar imager array forming a second layer of the multi-layer structure. Further, the phase difference detector includes an optical system configured to focus the measurement beam output from the phase difference detector on the single target location and to focus signals reflected at the target location to the phase difference detector.

20 Claims, 7 Drawing Sheets

(51) Int. Cl.
  *G01S 7/481*   (2006.01)
  *G01S 7/4915*   (2020.01)

(56) References Cited

FOREIGN PATENT DOCUMENTS

| | | |
|---|---|---|
| GB | 2289814 A | 11/1995 |
| JP | 2009205729 A | 9/2009 |
| WO | 2018015517 A1 | 1/2018 |
| WO | 2018219706 A1 | 12/2018 |

OTHER PUBLICATIONS

Li, Yanlu, Jinghao Zhu, Matthieu Duperron, Peter O'Brien, Ralf Schüler, Soren Aasmul, Mirko De Melis, Mathias Kersemans, and Roel Baets. "Six-beam homodyne laser Doppler vibrometry based on silicon photonics technology." Optics express 26, No. 3 (2018): 3638-3645.

Saeedi, Saman, Sylvie Menezo, Gabriel Pares, and Azita Emami. "A 25 GB/s 3D-integrated CMOS/silicon-photonic receiver for low-power high-sensitivity optical communication." Journal of Lightwave Technology 34, No. 12 (2016): 2924-2933.

Williams, Kevin A. "Prospects for electronic photonic integration." In Integrated Photonics Research, Silicon and Nanophotonics, pp. IW3A-1. Optical Society of America, 2017.

Quack, Niels, James Ferrara, Simone Gambini, Sangyoon Han, Christopher Keraly, Pengfei Qiao, Yi Rao et al. Development of an FMCW LADAR source chip using MEMS-electronic-photonic heterogeneous integration. No. POST_TALK. 2013.

Snyder, Bradley, Nivesh Mangal, Guy Lepage, Sadhishkumar Balakrishnan, Xiao Sun, Nicolas Pantano, Michal Rakowski et al. "Packaging and assembly challenges for 50G silicon photonics interposers." In 2018 Optical Fiber Communications Conference and Exposition (OFC), pp. 1-3. IEEE, 2018.

* cited by examiner

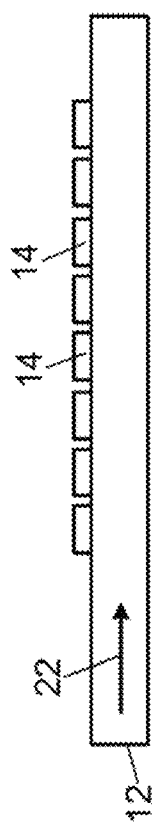
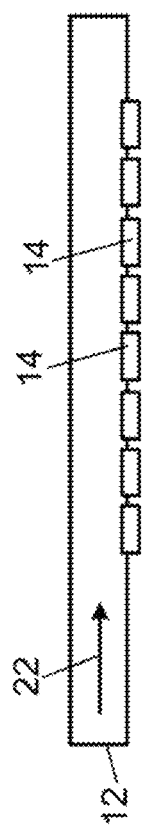
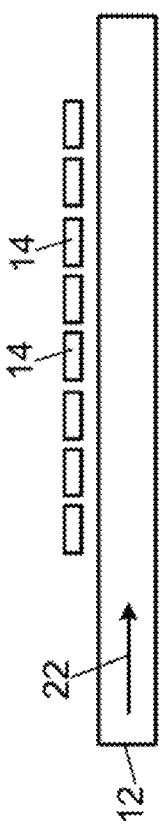
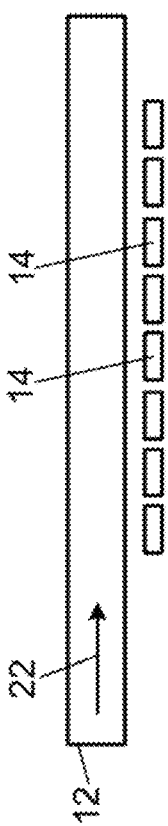
FIG. 3A  FIG. 3B  FIG. 3C  FIG. 3D
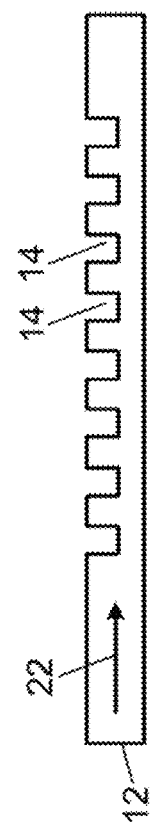
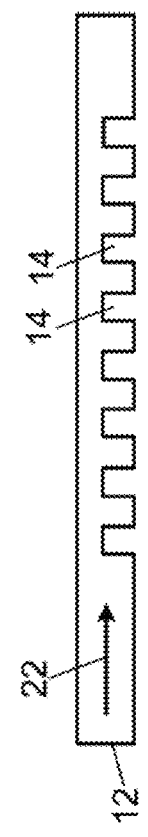
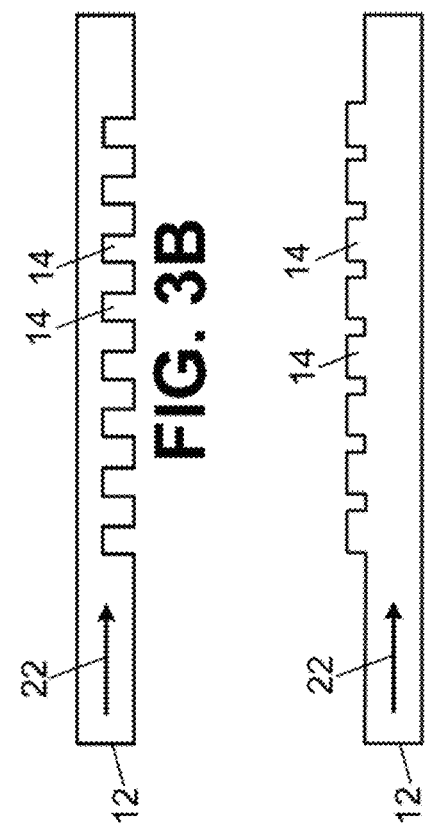
FIG. 3E  FIG. 3F  FIG. 3G  FIG. 3H

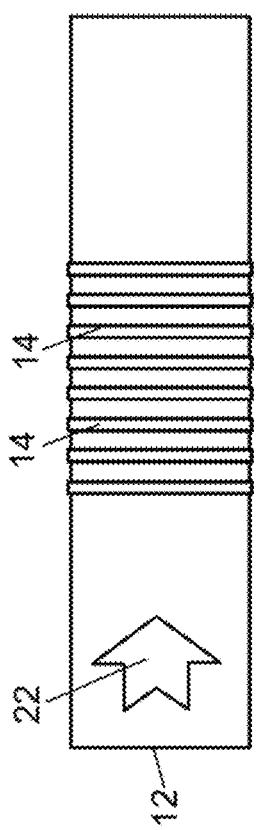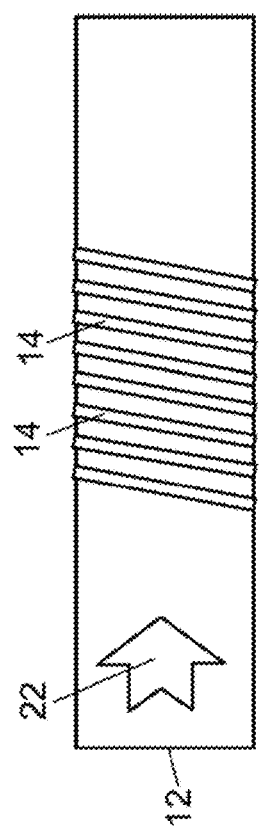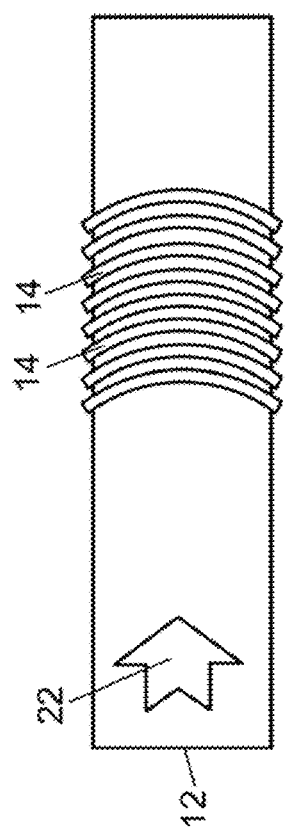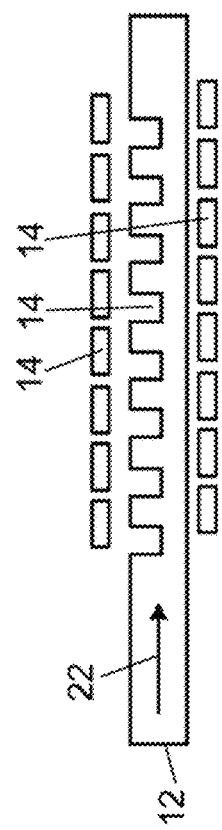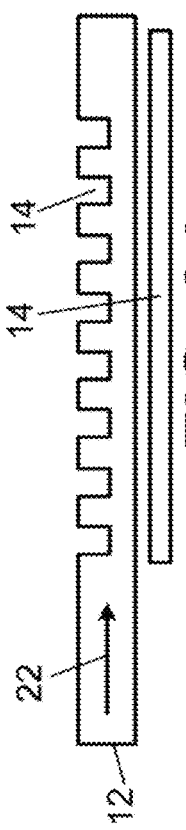

PHASE DIFFERENCE DETECTION SYSTEM AND A METHOD FOR DETECTING A PHASE DIFFERENCE

CROSS-REFERENCE TO RELATED APPLICATIONS

The present application is a national stage entry of PCT/EP2020/062265 filed May 4, 2020, which claims priority to EP 19173535.6 filed on May 9, 2019, the contents of each of which are hereby incorporated by reference.

Technical Field

The present disclosure relates to a phase difference detection system for a single target location. The present disclosure further relates to a method for detecting a phase difference between two laser beams due to reflection at a target location.

BACKGROUND

Phase difference detectors are used in different areas of technology, including laser Doppler vibrometry and determining refractive index changes at different locations of a medium.

A laser Doppler vibrometer (LDV) 1 is an instrument used to measure the temporal velocity or displacement of a vibrating surface 2 as illustrated in FIG. 1. The LDV 1 sends out a laser beam 3 which is reflected by surface 2 located a distance do away. The incoming reflected laser beam 4 is received by the LDV 1. The instantaneous frequency shift of the reflection signal $f_{Doppler}(t)$ is proportional to the temporal velocity v(t) of the target surface. The relation is expressed as $$f_{Doppler}(t) = \frac{2v(t)}{\lambda_0}, \quad (1)$$

where $\lambda_0$ is the wavelength of the measurement light. This relation can also be understood as the phase shift of the reflection beam as a result of the movement of the target surface:

$$\theta_{Doppler}(t) = \frac{2\pi}{\lambda_0} \cdot 2\Delta d(t). \quad (2)$$

The expression $\Delta d(t)$ is the displacement of the target surface in the direction of the laser beam. A factor of 2 is placed before $\Delta d(t)$ because the optical path change of the beam corresponds to a roundtrip of the displacement.

Laser Doppler vibrometry shows great vibration measurement accuracy with sub-nanometer resolution and has been applied in various fields, e.g. in bio-medical engineering and mechanics.

In some applications, vibration information may be obtained at multiple positions simultaneously, which is not easy for a commonly used single-point LDV system, also known as a one-beam LDV. To realize such measurements, two techniques are generally used: a scanning LDV and a multi-beam LDV.

Scanning LDV systems are used more often thanks to their flexibility and simplicity compared to the multi-beam LDV systems. However, the performance of the scanning LDV is limited by its scanning frequency, which usually cannot reach the MHz range due to mechanics-based scanning devices. Therefore, scanning LDV systems cannot typically detect a transient movement event, such as an impact.

On the other hand, a multi-beam LDV system has no such limitations and it can measure transient and non-periodic events. However, because multiple separate LDV devices are implemented in the same system, a multi-beam LDV system is usually more bulky and complex.

Recently, there have been attempts to realize a multi-beam LDV by combining multiple one-beam LDVs on a single chip for simultaneous measurement of multiple points on a single target as discussed in Yanlu Li et al., "*Six-beam homodyne laser Doppler vibrometry based on silicon photonics technology*", 2 Feb. 2018, Optical Society of America, OPTICS EXPRESS, Vol. 26, No. 3. It is proposed to use a single photonic integrated circuit (PIC) to create a six-beam LDV. The PIC has a single laser input and a first splitter to split the laser beam into a reference beam and a measurement beam. Another two splitters are used to split the reference beam and the measurement beam into six individual reference beams and measurement beams. Each of the six phase difference detectors has the same, common, design, Specifically, the individual measurement beams are sent towards the target by a transmit antenna and the reflection is received. The received reflected signal is sent to a mixer, e.g. a 90° optical hybrid, that mixes the received reflected signal and the reference signal. By using a 90° optical hybrid as the mixer, the mixer has four optical output signals that are converted, by photo-diodes, into photo-current signals. Using a demodulator allows determining the desired movement information from the photo-current signals.

While such a PIC may accommodate six LDVs, it is not straightforward to integrate a larger number of LDVs, e.g. more than twenty, on a single chip with a limited footprint, e.g. 1 mm². Especially the bonding pads and waveguide routes limit the number of LDVs realized on a single chip.

WO 2018/015517 A1 discloses a lens free imaging device for creating holographic images. The lens free imaging device comprises a waveguide with a first diffracting element to split a part of the waveguide light into a first light wave oriented to a target and a second light wave oriented towards an image sensor. The first light wave is scattered by the target and the resulting scattered light wave is also received at the image sensor. The scattered light wave and the second light wave are combined to form an image.

SUMMARY OF THE DISCLOSURE

The present disclosure provides a LDV design which allows a large number of them to be combined on a single chip.

This is achieved according to the disclosure with a phase difference detection system for a single target location, the phase difference detection system comprising: a laser source to generate a laser beam; a phase difference detector coupled to the laser source and having a multi-layer structure comprising: a planar waveguide for guiding the laser beam, the planar waveguide having a normal direction and forming a first layer of the multi-layer structure; a grating coupler to split the laser beam into a reference beam and a measurement beam, wherein the measurement beam is directed towards the target location and the reference beam is directed away from the target location, the reference beam and the measurement beam each being inclined with respect to the normal direction; and a planar imager array forming a second layer of the multi-layer structure, the imager array being configured to detect a fringe pattern generated by the reference beam and an incoming beam, the incoming beam being the result of the measurement beam having been reflected at the target location and having passed through the grating coupler; and an optical system configured to focus the measurement beam output from the phase difference detector on the single target location and to focus signals reflected at the target location to the phase difference detector.

The grating coupler couples the coherent light from the waveguide to both upward and downward directions of the grating coupler, i.e. it splits the coherent light from the waveguide into the reference beam and the measurement beam. The wavelength of the laser beam, the refractive index of the grating coupler and the period of the grating coupler are so chosen such as to ensure that the reference beam and the measurement beam each are inclined with respect to the normal direction of the waveguide. This is possible as these quantities are linked as discussed below.

The measurement laser beam is focused to the target location with the help of an optical system. Due to reflection at the target location, a reflected beam is sent back towards the phase difference detector, i.e. towards the grating coupler. The reflected beam can be considered to be parallel to the measurement beam but travelling in the opposite direction. In this way, the incoming beam that is the result of the measurement beam having been reflected at the target location and the reference beam are angled with respect to one another so they create an interference pattern, also known as a fringe pattern. The imager array detects this fringe pattern from which the phase difference between the reference beam and the incoming beam may be determined.

By using the fringe pattern detected by the imager to determine the phase difference, there is no need to have mixers and photo-diodes, nor are separate waveguides for the reference and measurement signals required. Consequently, a large number of them may be combined on a single chip.

Moreover, having the incoming beam pass through the grating coupler may minimizes the required area for the phase detector. In particular, when compared to the lens free imaging device disclosed in WO 2018/015517 A1, the imager may now be placed below the grating coupler instead of next to it, thus reducing the required on-chip area. Furthermore, although the grating coupler affects light passing through it, the phase behaviour of the incoming beam which passes through the grating coupler may remain unaffected. As such, the fringe pattern is not affected by the incoming beam passing through the grating coupler.

In an embodiment of the present disclosure, the optical system comprises a small aperture, in particular a pin-hole, provided above the grating coupler.

Since the target location may vary, it is not ensured that the reflected beam is parallel to the outgoing beam. In cases where the reflected beam is not parallel to the outgoing beam, the small aperture corrects this and ensures that the reflected beam, after having passed the small aperture, is parallel to the outgoing beam.

In an embodiment of the present disclosure, the first layer and the second layer are separated by a distance of 1 μm to 20 μm.

In an embodiment of the present disclosure, the reference beam and the measurement beam each are inclined with respect to the normal direction with an angle that is between 19 and 10° (e.g., 29).

In an embodiment of the present disclosure, the grating coupler is one of: a slanted grating, a curved grating, a compact grating, a patterned grating, an apodized grating, a 2D grating, and a 2D apodized grating.

In an embodiment of the present disclosure, the grating coupler is formed by one of: grooves in the waveguide, which grooves may optionally be filled with a material different from the waveguide material, or protrusions from the waveguide, which protrusions may optionally be formed from a material different from the waveguide material.

In an embodiment of the present disclosure, the grating coupler comprises at least one additional layer separated from the waveguide.

The various possible designs of the grating coupler allow flexibility in designing the phase difference detector.

In an embodiment of the present disclosure, the imager array comprises a plurality of CCD, CMOS, or NMOS imagers.

The various possible designs of the imager array allow flexibility in designing the phase difference detector.

In an embodiment of the present disclosure, the phase difference detector further comprises a processing unit configured to determine a phase shift between the reference beam and the incoming beam based on the fringe pattern.

In an embodiment of the present disclosure, the phase difference detector is used to perform laser Doppler vibrometry of the target location.

The present disclosure also provides a method for detecting a phase difference between two laser beams due to reflection at a target location, the method comprising the steps of: guiding a laser beam within a planar waveguide having a normal direction; splitting the laser beam using a grating coupler into a reference beam and a measurement beam, wherein the measurement beam is directed towards the target location and the reference beam is directed away from the target location, the reference beam and the measurement beam each being inclined with respect to the normal direction; detecting a fringe pattern generated by the reference beam and an incoming beam, the incoming beam being the result of the measurement beam having been reflected at the target location and having passed through the grating coupler, and deriving a phase difference between the reference beam and the incoming beam based on the fringe pattern.

BRIEF DESCRIPTION OF THE DRAWINGS

The disclosure will be further explained by means of using the following description and the appended figures.

FIG. 3A shows a longitudinal cross-section of a waveguide-grating coupler pair suitable for use in the phase difference detector of FIG. 2, according to example embodiments.

FIG. 3B shows a longitudinal cross-section of a waveguide-grating coupler pair suitable for use in the phase difference detector of FIG. 2, according to example embodiments.

FIG. 3C shows a longitudinal cross-section of a waveguide-grating coupler pair suitable for use in the phase difference detector of FIG. 2, according to example embodiments.

FIG. 3D shows a longitudinal cross-section of a waveguide grating coupler pair suitable for use in the phase difference detector of FIG. 2, according to example embodiments.

FIG. 3E shows a longitudinal cross-section of a waveguide-grating coupler pair suitable for use in the phase difference detector of FIG. 2, according to example embodiments.

FIG. 3F shows a longitudinal cross-section of a waveguide-grating coupler pair suitable for use in the phase difference detector of FIG. 2, according to example embodiments.

FIG. 3G shows a longitudinal cross-section of a waveguide-grating coupler pair suitable for use in the phase difference detector of FIG. 2, according to example embodiments.

FIG. 3H shows a longitudinal cross-section of a waveguide-grating coupler pair suitable for use in the phase difference detector of FIG. 2, according to example embodiments.

FIG. 3I shows a longitudinal cross-section of a waveguide-grating coupler pair suitable for use in the phase difference detector of FIG. 2, according to example embodiments.

FIG. 3J shows a longitudinal cross-section of a waveguide-grating coupler pair suitable for use in the phase difference detector of FIG. 2, according to example embodiments.

FIG. 4A shows a top view of a waveguide-grating coupler pair suitable for use in the phase difference detector of FIG. 2, according to example embodiments.

FIG. 4B shows a top view of a waveguide-grating coupler pair suitable for use in the phase difference detector of FIG. 2, according to example embodiments.

FIG. 4C shows a top view of a waveguide-grating coupler pair suitable for use in the phase difference detector of FIG. 2, according to example embodiments.

DETAILED DESCRIPTION

Figure 1:
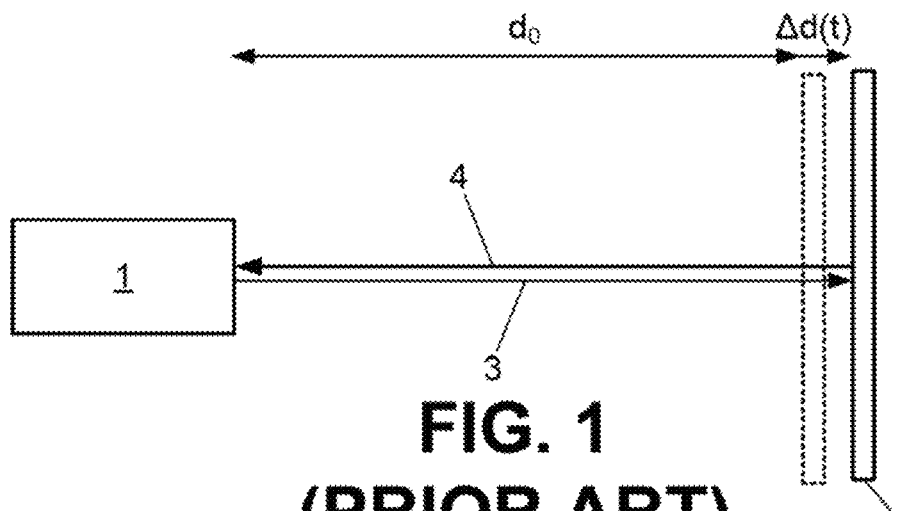
FIG. 1 shows a schematic set-up of a one-beam LDV.

The present disclosure will be described with respect to particular embodiments and with reference to certain drawings but the disclosure is not limited thereto but only by the claims. The drawings described are only schematic and are non-limiting. In the drawings, the size of some of the elements may be exaggerated and not drawn on scale for illustrative purposes. The dimensions and the relative dimensions do not necessarily correspond to actual reductions to practice of the disclosure.

Furthermore, the terms first, second, third, and the like in the description and in the claims, are used for distinguishing between similar elements and not necessarily for describing a sequential or chronological order. The terms are interchangeable under appropriate circumstances and the embodiments of the disclosure can operate in other sequences than described or illustrated herein.

Moreover, the terms top, bottom, over, under, and the like in the description and the claims are used for descriptive purposes. The terms so used are interchangeable under appropriate circumstances and the embodiments of the disclosure described herein can operate in other orientations than described or illustrated herein.

Furthermore, the various embodiments are to be construed as example manners in which the disclosure may be implemented rather than as limiting the scope of the disclosure.

In the following description, the phase difference detector according to the present disclosure will be explained by reference to its use in laser Doppler vibrometry. However, the phase difference detector according to the present disclosure may also be used with a static reflector which induces no phase changes in the reflected light. In this way, any phase change is due to refractive index changes at different locations of a medium (e.g. air). Based on the measured phase changes the distribution of pressure or temperature may be derived, which, in turn, may be used to map changes in sound speed. Another possible application is the movement (e.g. tilt or rotation) of an entire surface which may be derived from the phase change at each location. In particular, the phase shifts at various locations across the surface will be related to one another due to the rotational movement, which relation allows to detect the movement.

Figure 2:
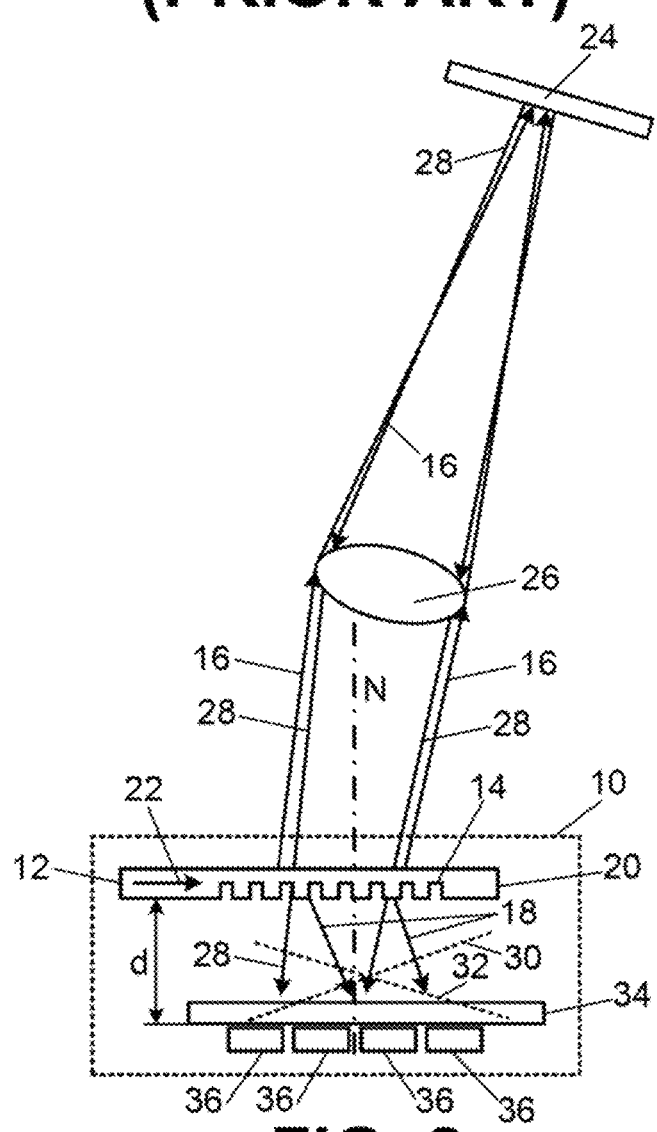
FIG. 2 shows a phase difference detector, according to example embodiments.

A phase difference detector 10 according to the present disclosure is shown in FIG. 2. The phase difference detector 10 comprises an incoming waveguide 12 attached to a grating coupler 14. The incoming waveguide 12 is connected to an external laser source (not shown) either in a direct connection or through the intermediary of one or more other waveguides and/or splitters. The laser beam guided in the incoming waveguide 12 passes the grating coupler 14 as indicated by arrow 22, which causes the laser beam to be split into at least two components, namely an upwards travelling measurement beam 16 and a downwards travelling reference beam 18. Optionally, a part of the laser beam may also continue onwards past the grating coupler 14 to remain in an outgoing waveguide 20 that may be coupled to a subsequent phase difference detector as described in greater detail with respect to FIG. 6.

The wavelength of the laser beam, the refractive index of the grating coupler and the period of the grating coupler are so chosen such as to ensure that the reference beam 18 and the measurement beam 16 each are inclined with respect to the normal direction N of the waveguide 12. This is possible as these quantities are linked by $$\sin\theta = \frac{n_{wg} - \lambda/\Lambda}{n_{med}} \tag{3}$$

where $n_{wg}$ is the effective refractive index of light in the grating coupler 14, $n_{med}$ is the refractive index of light in the medium outside the grating coupler 14, which is normally 1 for air, λ is the wavelength of the laser beam in vacuum, Λ is the period of the grating coupler 14, and θ is the angle between the split beams and the normal direction N as illustrated in FIG. 2.

Various possible designs of grating couplers 14 are possible as illustrated in FIGS. 3A to 4I.

FIGS. 3A and 3B illustrate a waveguide-grating coupler pair 12, 14 that is formed by removing part of the material of the waveguide 12 to form a crenelated surface which acts as the grating coupler 14. The crenelated surface may be either the top surface (FIG. 3A) or the bottom surface (FIG. 3B) of the waveguide 12. A similar design is shown in FIGS. 3C and 3D where, instead of removing material, material has been added to form the crenelated surface.

The waveguide-grating coupler pair 12, 14 of FIGS. 3E and 3F has the same shape as those of FIGS. 3C and 3D, but the material that was added on top of or below the waveguide 12 to act as the grating coupler 14 is different to the material of the waveguide 12. The waveguide may be silicon nitride, while the material surrounding silicon nitride can be silicon oxide, air, or other materials with a low refractive index.

It will also be appreciated that the grating coupler 14 may also not be in direct contact with the waveguide 12 as shown in FIGS. 3G and 3H.

It will also be appreciated that the grating coupler 14 may be formed by various layers as illustrated in FIGS. 3I and 3J.

Moreover, the crenelated surface that acts as the grating coupler 14 may also have different planar configurations as shown in the top views of FIGS. 4A to 4I.

Figure 4D:
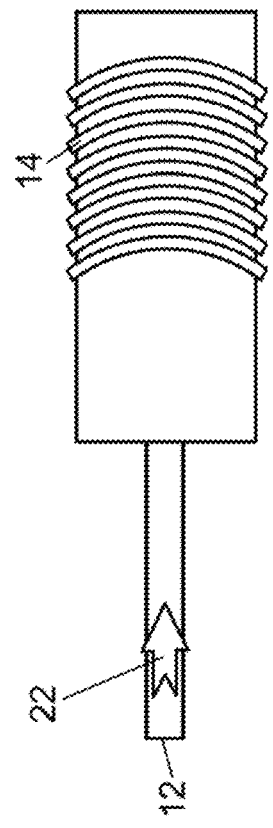
FIG. 4D shows a top view of a waveguide-grating coupler pair suitable for use in the phase difference detector of FIG. 2, according to example embodiments.
Figure 4E:
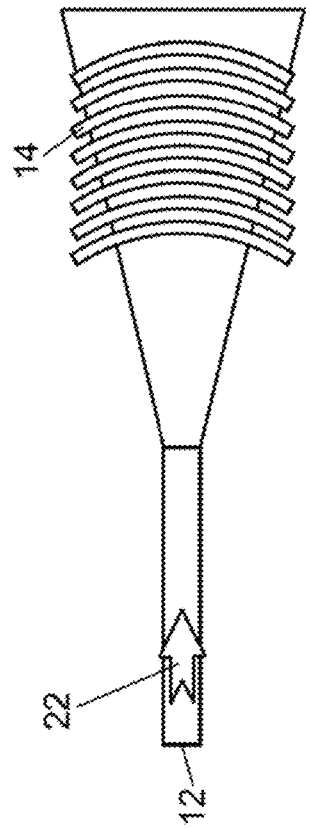
FIG. 4E shows a top view of a waveguide-grating coupler pair suitable for use in the phase difference detector of FIG. 2, according to example embodiments.
Figure 4F:
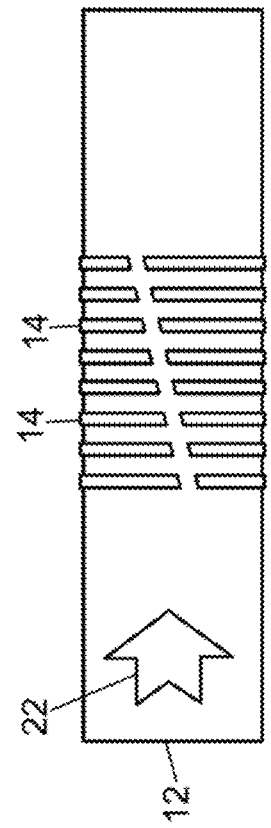
FIG. 4F shows a top view of a waveguide-grating coupler pair suitable for use in the phase difference detector of FIG. 2, according to example embodiments.
Figure 4G:
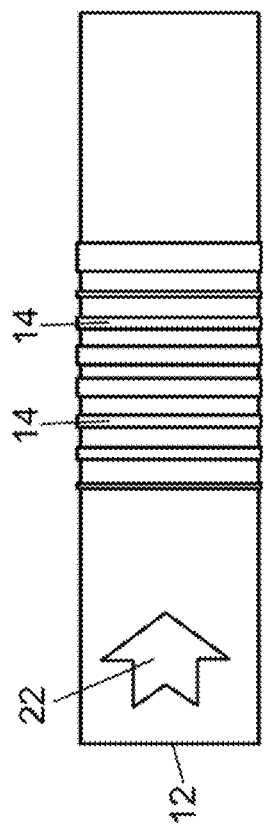
FIG. 4G shows a top view of a waveguide-grating coupler pair suitable for use in the phase difference detector of FIG. 2, according to example embodiments.
Figure 4H:
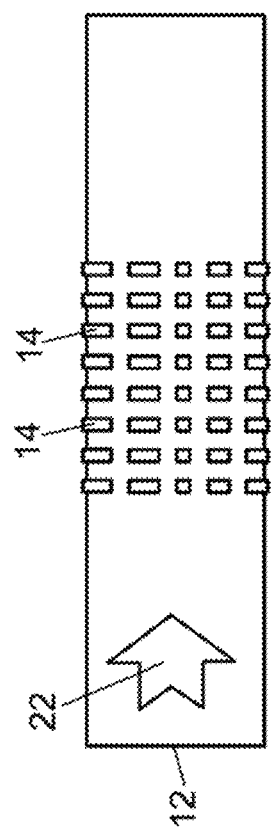
FIG. 4H shows a top view of a waveguide-grating coupler pair suitable for use in the phase difference detector of FIG. 2, according to example embodiments.
Figure 4I:
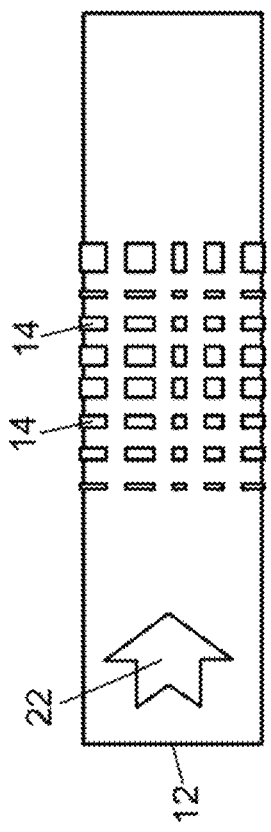
FIG. 4I shows a top view of a waveguide-grating coupler pair suitable for use in the phase difference detector of FIG. 2, according to example embodiments.

FIGS. 4A to 4C illustrate a perpendicular, slanted, and curved waveguide-grating coupler pair 12, 14 respectively. In order to reduce the size of the waveguide-grating coupler pair 12, 14, it is also possible to use a compact grating coupler 14 as illustrated in FIGS. 4D and 4E. A patterned grating coupler 14 is illustrated in FIG. 4F, while an apodized grating coupler 14 is shown in FIG. 4G. Two-dimensional grating couplers 14 are also possible as shown in FIGS. 4H and 4I.

Which design for the waveguide-grating coupler pair 12, 14 is chosen will depend on the application. However, in general, the grating coupler 14 should split the light upward and downward with a proper splitting ratio. Typically, more light should be sent to the measurement target, so that the interference pattern has high signal quality. Another important factor is that the grating coupler 14 should be long enough to cover more than 2 fringes, but not too long to avoid distributing the optical power to a too large region. A third important factor is that most light may be coupled to upward or downward directions rather than being reflected or transmitted through the grating.

Returning to FIG. 2, the upwards travelling measurement beam 16 is focussed on a single target location 24 by use of an external optical focussing system 26, e.g. one or more lenses. Due to reflection at the target location 24, a reflected beam is sent back towards the phase difference detector 10, again via the external optical focussing system 26. The optical system 26 may include a small aperture, such as a pin-hole, which ensures that the reflected laser beam is parallel to the measurement beam 16 but travelling in the opposite direction when arriving back at the phase difference detector 10, in particular the grating coupler 14 thereof. In this way, the incoming beam 28 that is the result of the measurement beam 16 having been reflected at the target location 24 and the reference beam 18 are angled with respect to one another. This angle is illustrated using lines 30, 32 that illustrate the wave front of the reference beam 18 and the incoming beam 28 respectively.

Since the wave fronts 30, 32 are angled with respect to one another, which angling is due to the initial angle between the beams 16, 18 and the normal direction N, an interference pattern 34, also known as a fringe pattern, is created. The phase difference detector 10 is provided with an imager array 36 that detects this fringe pattern from which the phase difference between the reference beam 18 and the incoming beam 28 may be determined.

The phase difference of the incoming beam 28 can be determined by viewing the phase shift of the fringe pattern. To derive this phase shift, various techniques may be used on the data obtained from the imager array 36. Examples of such techniques are a fast-Fourier transform, cross-correlation, and other methods.

Depending on the application, different imager arrays 36 may be used. For example, a plurality of CCD, CMOS, or NMOS imagers may be used. The selection of one type of imager of the other depends on the sensitivity (the higher the better), the pixel size (the smaller the better), the frame rate (the higher the better), and the cost.

The distance d between the waveguide-grating coupler layer 12, 14 and the imager array 36 is dependent on the application. In particular, the maximal distance d determines the size of the interference pattern. Specifically, the effective length interference pattern is $L_{inter}=L_{grating}-2d \tan \theta$ and should, typically, be greater than 2 fringes with a period of $$\frac{\lambda/2}{\sin \theta}.$$

In case θ=2 degrees, $L_{grating}$=20 μm, and λ=633 nm, the distance d should be smaller than 27 μm.

The angle θ determines the period of fringe, which is $$\frac{\lambda/2}{\sin \theta}.$$

In some embodiments, the pitch of the imager array 36 is smaller than ¼ of the fringes to ensure high resolution. In other words, the pixel pitch is smaller than $$\frac{1}{4}\frac{\lambda/2}{\sin \theta}.$$

In case of a CMOS imager array 36, the pitch may be as small as 2 μm, meaning that the angle θ has to be equal to or smaller than 2 degrees when λ=633 nm.

Figure 5:
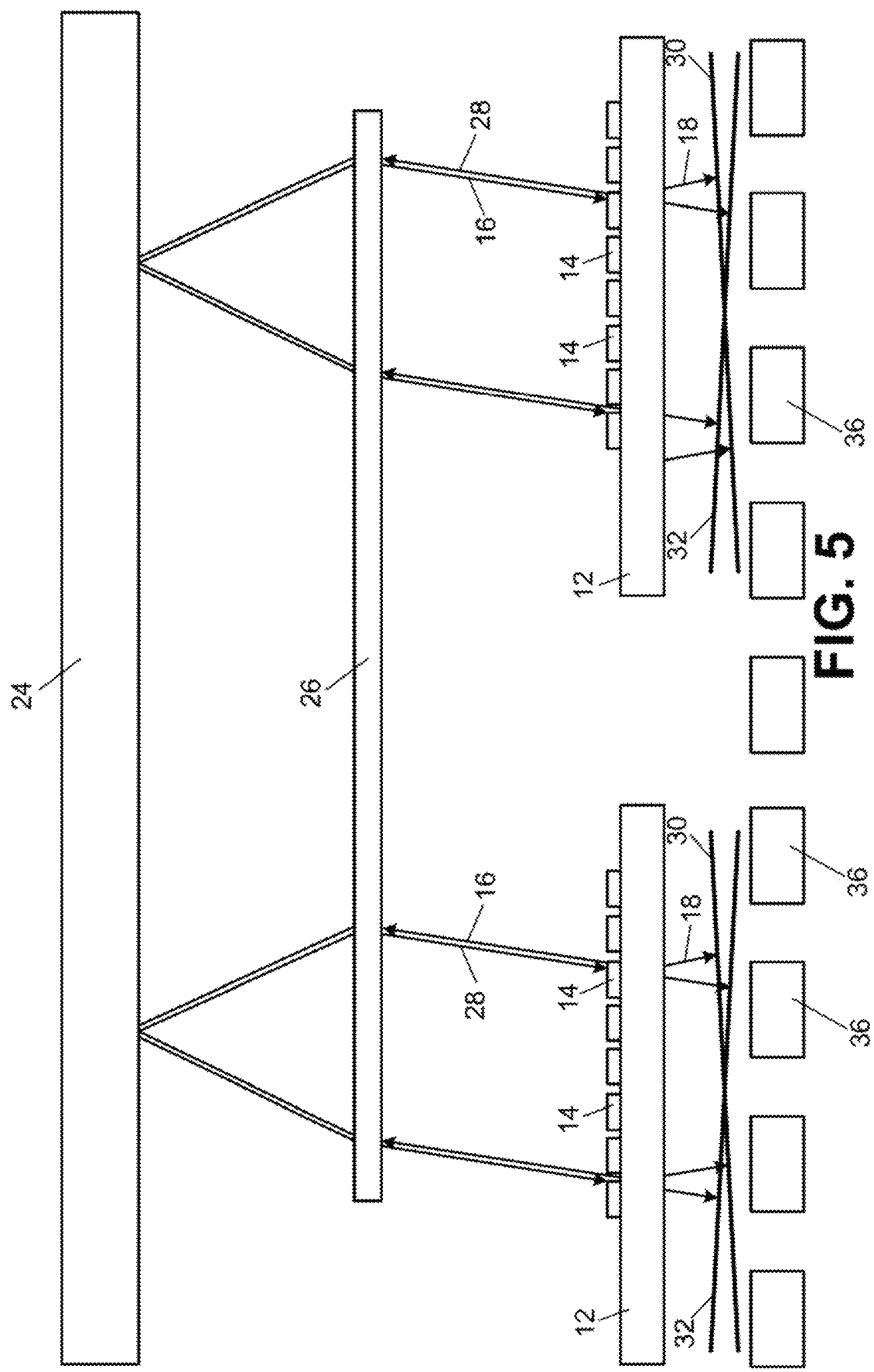
FIG. 5 shows a multi-beam phase difference detector, according to example embodiments.
Figure 6:
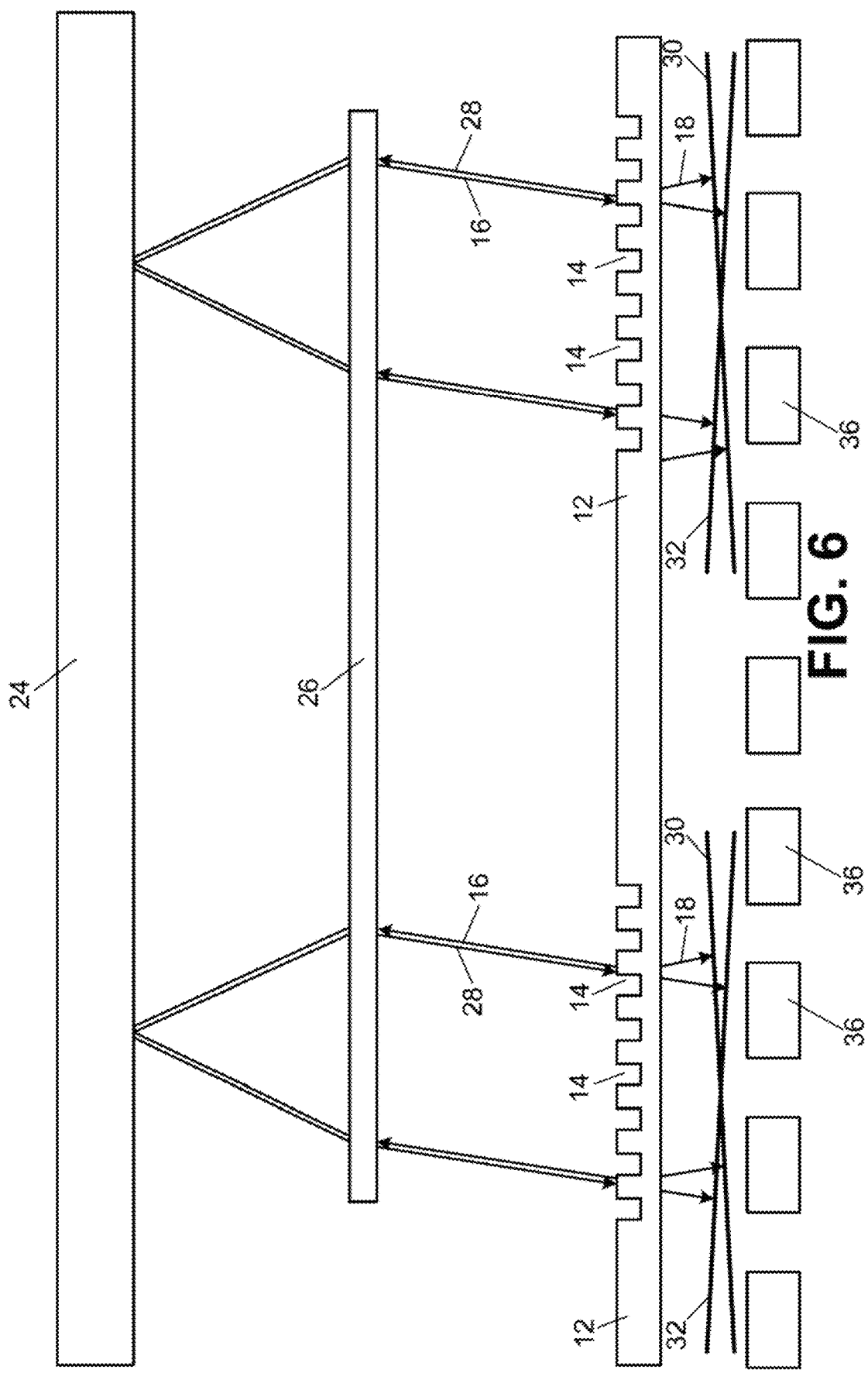
FIG. 6 shows an alternative multi-beam phase difference detector, according to example embodiments.
Figure 7:
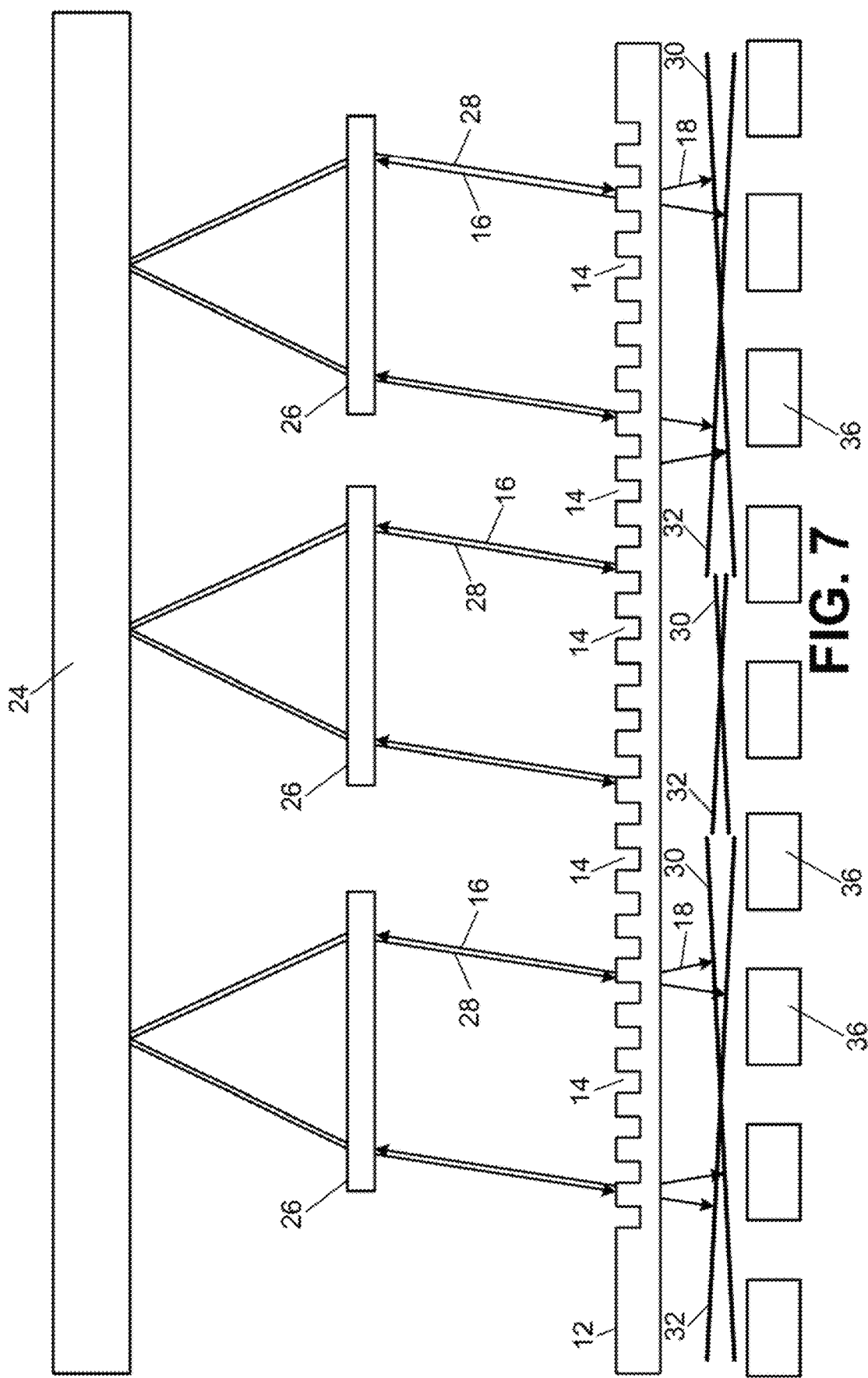
FIG. 7 shows another alternative multi-beam phase difference detector, according to example embodiments.

FIGS. 5 to 7 show various phase detector designs for simultaneous phase change detection at different locations. It should be noted that reference number 26 is used to denote any properly adapted external optical focussing system, which may include one or more convex or concave lenses, FIG. 5 illustrates a chip 100 having two phase difference detectors that share a common imager array 36. The waveguides 12 are split from one another and may be connected to a same external laser source (not shown), e.g. via splitter, or to different external laser sources. Due to the presence of two grating couplers 14, a simultaneous measurement at two different locations is possible. FIG. 6 shows a slight variation of the design of FIG. 5 where the waveguides 12 are connected to one another. Another possible design is shown in FIG. 7 where multiple external focussing systems 26 are provided to focus the output of an elongated grating coupler 14 to various locations on the target 24.

It will be readily appreciated that multiple phase difference detectors may also be set-up in a two-dimensional array structure.

Although aspects of the present disclosure have been described with respect to specific embodiments, it will be readily appreciated that these aspects may be implemented in other forms within the scope of the disclosure as defined by the claims.

The invention claimed is:

1. A phase difference detection system for a single target location, the phase difference detection system comprising:
   a laser source to generate a laser beam;
   a phase difference detector coupled to the laser source and having a multi-layer structure comprising:
      a planar waveguide for guiding the laser beam, the planar waveguide having a normal direction and forming a first layer of the multi-layer structure;
      a grating coupler to split the laser beam into a reference beam and a measurement beam, wherein the measurement beam is directed towards the target location and the reference beam is directed away from the target location, the reference beam and the measurement beam each being inclined with respect to the normal direction; and
      a planar imager array forming a second layer of the multi-layer structure, the imager array being configured to detect a fringe pattern generated by the reference beam and an incoming beam, the incoming beam being the result of the measurement beam having been reflected at the target location and having passed through the grating coupler; and
   an external optical system configured to focus the measurement beam output from the phase difference detector on the single target location and to focus signals reflected at the target location to the phase difference detector.

2. The phase difference detection system according to claim 1, wherein the external optical system comprises a pin-hole provided above the grating coupler.

3. The phase difference detection system according to claim 1, wherein the first layer and the second layer are separated by a distance of between 1 μm and 20 μm.

4. The phase difference detection system according to claim 1, wherein the reference beam and the measurement beam each are inclined with respect to the normal direction with an angle that is between 1° and 10°.

5. The phase difference detection system according to claim 1, wherein the grating coupler comprises: a slanted grating, a curved grating, a compact grating, a patterned grating, an apodized grating, a 2D grating, or a 2D apodized grating.

6. The phase difference detection system according to claim 1, wherein the grating coupler is formed by grooves in the waveguide or protrusions from the waveguide.

7. The phase difference detection system according to claim 1, wherein the grating coupler comprises at least one additional layer separated from the waveguide.

8. The phase difference detection system according to claim 1, wherein the imager array comprises a plurality of CCD imagers, CMOS imagers, or NMOS imagers.

9. The phase difference detection system according to claim 1, wherein the phase difference detector further comprises a processing unit configured to determine a phase shift between the reference beam and the incoming beam based on the fringe pattern.

10. A method of performing laser Doppler vibrometry of a target location using the phase difference detection system according to claim 1 by detecting a phase difference between two laser beams due to reflection at the target location, the method comprising:
    guiding a laser beam within a planar waveguide having a normal direction;
    splitting the laser beam using a grating coupler into a reference beam and a measurement beam, wherein the measurement beam is directed towards the target location and the reference beam is directed away from the target location, the reference beam and the measurement beam each being inclined with respect to the normal direction;
    detecting a fringe pattern generated by the reference beam and an incoming beam, the incoming beam being the result of the measurement beam having been reflected at the target location and having passed through the grating coupler; and
    deriving a phase difference between the reference beam and the incoming beam based on the fringe pattern.

11. A method for detecting a phase difference between two laser beams due to reflection at a target location, the method comprising:
    guiding a laser beam within a planar waveguide having a normal direction;
    splitting the laser beam using a grating coupler into a reference beam and a measurement beam, wherein the measurement beam is directed towards the target location and the reference beam is directed away from the target location, the reference beam and the measurement beam each being inclined with respect to the normal direction;
    detecting a fringe pattern generated by the reference beam and an incoming beam, the incoming beam being the result of the measurement beam having been reflected at the target location and having passed through the grating coupler; and
    deriving a phase difference between the reference beam and the incoming beam based on the fringe pattern.

12. The method of claim 10, wherein the external optical system comprises a pin-hole provided above the grating coupler.

13. The method of claim 10, wherein the first layer and the second layer are separated by a distance of between 1 μm and 20 μm.

14. The method of claim 10, wherein the reference beam and the measurement beam each are inclined with respect to the normal direction with an angle that is between 1° and 10°.

15. The method of claim 10, wherein the grating coupler comprises: a slanted grating, a curved grating, a compact grating, a patterned grating, an apodized grating, a 2D grating, or a 2D apodized grating.

16. The method of claim 10, wherein the grating coupler is formed by grooves in the waveguide or protrusions from the waveguide.

17. The method of claim 10, wherein the grating coupler comprises at least one additional layer separated from the waveguide.

18. The phase difference detection system according to claim 4, wherein the reference beam and the measurement beam each are inclined with respect to said the normal direction with an angle that is 2°.

19. The phase difference detection system according to claim 6, wherein the grating coupler is formed by grooves in the waveguide, and wherein the grooves in the waveguide are filled with a material different from the waveguide material.

20. The phase difference detection system according to claim 6, wherein the grating coupler is formed by protrusions from the waveguide, and wherein the protrusions from the waveguide are formed from a material different from the waveguide material.

* * * * *